(12) United States Patent
Chlebovec et al.

(10) Patent No.: US 10,150,621 B2
(45) Date of Patent: Dec. 11, 2018

(54) DEVICE FOR PROTECTING THE CONVEYOR BELT OF A TUBE CONVEYOR AGAINST VOLUMETRIC OVERLOADING

(71) Applicant: SCHENCK PROCESS S.R.O., Praha 6-Ruzyne (CZ)

(72) Inventors: Michal Chlebovec, Poprad-Velka (SK); Jiri Zelenka, Praha 5-Zbraslav (CZ)

(73) Assignee: Schenck Process s.r.o., Ruzyne (CZ)

( * ) Notice: Subject to any disclaimer, the term of this patent is extended or adjusted under 35 U.S.C. 154(b) by 0 days.

(21) Appl. No.: 15/882,361

(22) Filed: Jan. 29, 2018

(65) Prior Publication Data

US 2018/0162650 A1 Jun. 14, 2018

Related U.S. Application Data

(63) Continuation of application No. PCT/EP2016/001307, filed on Jul. 28, 2016.

(30) Foreign Application Priority Data

| Jul. 29, 2015 | (CZ) | 2015-525 |
| Jul. 29, 2015 | (CZ) | 2015-526 |

(Continued)

(51) Int. Cl.
| B65G 15/08 | (2006.01) |
| B65G 43/02 | (2006.01) |
| B65G 43/08 | (2006.01) |

(52) U.S. Cl.
CPC ............ B65G 43/02 (2013.01); B65G 15/08 (2013.01); B65G 43/08 (2013.01);
(Continued)

(58) Field of Classification Search
CPC .............................. B65G 43/02; B65G 43/08; B65G 2203/0283; B65G 2207/40;
(Continued)

(56) References Cited

U.S. PATENT DOCUMENTS

| 4,402,395 A | * | 9/1983 | Hashimoto | ............ | B65G 15/08 198/807 |
| 5,031,753 A | * | 7/1991 | Tschantz | ................ | B65G 15/08 198/819 |

(Continued)

FOREIGN PATENT DOCUMENTS

| CN | 201485012 U | 5/2010 |
| CN | 104396449 A | 3/2015 |

(Continued)

OTHER PUBLICATIONS

Czech Search Report for Czech Republic Application No. PV 2015-526 dated Nov. 18, 2015—English translation.

*Primary Examiner* — Mark A Deuble
(74) *Attorney, Agent, or Firm* — Muncy, Geissler, Olds & Lowe, P.C.

(57) ABSTRACT

A tube conveyor with a device for protecting the conveyor belt of the tube conveyor against volumetric overloading, the tube conveyor containing a middle part, situated between a filling site and a discharge site. The conveyor belt coiled essentially into the shape of a tube by the action of rollers mounted on roller stands, a measuring stand is arranged behind the filling site, the measuring stand comprising a stationary frame and a swiveling frame able to pivot relative to the stationary frame, the stationary frame comprising lower rollers mounted beneath a horizontal transverse axis of the coiled conveyor belt, the swiveling frame having upper inclined rollers mounted above the horizontal transverse axis of the coiled conveyor belt and having a force measuring device provided for continuous detection of the loading forces transferred from the conveyor belt, and provided for sending signals representing the loading forces to a control unit.

12 Claims, 5 Drawing Sheets

(30) Foreign Application Priority Data

Jul. 29, 2015 (CZ) .............................. 2015-31372 U
Jul. 29, 2015 (CZ) .............................. 2015-31373 U (52) U.S. Cl.
CPC .. *B65G 2201/04* (2013.01); *B65G 2203/0283* (2013.01); *B65G 2207/40* (2013.01)

(58) Field of Classification Search
CPC .... B65G 2203/0266; B65G 2203/0275; B65G 15/08; B65G 2201/04; B65G 2201/042; B65G 2201/0045
USPC ......... 198/819, 502.1, 502.2, 810.01–810.04
See application file for complete search history.

(56) References Cited

U.S. PATENT DOCUMENTS

| | | | | |
|---|---|---|---|---|
| 5,222,594 A | * | 6/1993 | Sumino | ................. B65G 15/08 198/807 |
| 6,702,103 B1 | * | 3/2004 | Kusel | .................... B65G 15/08 198/502.1 |
| 2009/0038911 A1 | * | 2/2009 | Aizawa | ................. B65G 15/08 198/502.1 |
| 2012/0283870 A1 | | 11/2012 | Senger et al. | |

FOREIGN PATENT DOCUMENTS

| | | | | |
|---|---|---|---|---|
| CN | 204355697 U | | 5/2015 | |
| DE | 40 18 575 A1 | | 12/1991 | |
| DE | 10 2013 107 502 A | | 1/2015 | |
| EP | 0718218 A2 | * | 6/1996 | ............ B65G 15/08 |
| EP | 2 128 049 A1 | | 12/2009 | |
| JP | S 61-221007 A | | 10/1986 | |
| JP | S 61-221008 A | | 10/1986 | |
| JP | 05105522 A | * | 4/1993 | ............ B65G 43/02 |
| JP | 06024538 A | * | 2/1994 | ............ B65G 43/03 |
| JP | H 06-329223 A | | 11/1994 | |
| JP | H 10-181841 A | | 7/1998 | |
| KR | 10-2004-0081822 A | | 9/2004 | |
| SK | 206-2013 U1 | | 5/2014 | |

* cited by examiner

DEVICE FOR PROTECTING THE CONVEYOR BELT OF A TUBE CONVEYOR AGAINST VOLUMETRIC OVERLOADING

This nonprovisional application is a continuation of International Application No. PCT/EP2016/001307, which was filed on Jul. 28, 2016, and which claims priority to Czech Patent Application Nos. PV2015-526, PUV2015-31373, PV2015-525 and PUV2015-31372, which were filed in Czech Republic on Jul. 29, 2015, and which are all herein incorporated by reference.

BACKGROUND OF THE INVENTION

Field of the Invention

The present invention relates to a device for protecting the conveyor belt of a tube conveyor against volumetric overloading, containing a middle part, situated between a filling site and a discharge site, where in the middle part of the conveying branch the conveyor belt is wound essentially into the shape of a tube by the action of rollers, rotationally mounted on roller stands and arranged into a regular n-hedron. In addition the technical solution relates to a releasing stand of said tube conveyor.

Description of the Background Art

It is known for tube conveyors that their conveyor belt cannot be overloaded due to an equilibrium of forces between internal forces in the conveyor belt and forces from the material being conveyed, which depends in particular on a bulk density, the angle of repose, and a compressibility of the material being conveyed. If the conveyor belt is overloaded, the conveyor belt will not coil into a circular cross section, but instead will bulge before the first roller stand. This bulging exceeds the contour specified for the coiled conveyor belt. The result is excessive strain on the roller stands, which are provided to wind the conveyor belt in the conveying branch into the shape of a tube. If the overloading is not observed in good time, there may be fundamentally greater resistances when the overloaded conveyor belt passes through the roller stands, or even a spontaneous stoppage of the tube conveyor.

In order to remedy these effects, releasing stands are installed in the conveying branch. Their most common design is in that they contain a stationary frame, which pivoting frame is mounted to. Rollers are mounted to the stationary frame, the rollers supporting the conveyor belt from the bottom, while upper rollers are secured to the pivoting frame. The pivoting frame is fixed onto the stationary frame so as to be motionless when loaded with ordinary operating forces. However, if bulging results on account of excessive volumetric filling of the conveyor belt, the forces acting on the releasing stand will increase. As a result, a fixation is disrupted and the pivoting frame swivels in the direction of travel of the conveyor belt. This increases a gap between the rollers and an attendant must halt the conveyor belt, open it, up and remove the excess material being conveyed.

The fixation mechanism for immobilizing the pivoting frame is in the most simple case designed as a strap, which is secured to the stationary frame which the pivoting frame is mounted to. When the forces acting on the pivoting frame increase, the strap bends, allowing the pivoting frame to be tilted. After the excess conveyed material is removed, the pivoting frame swings back to the stationary frame and the deformed strap is replaced with a new one. This solution is simple and relatively reliable. However, from the standpoint of a smooth operation, it is quite disadvantageous, since all bent straps have to be replaced by hand.

More suitable is a fixation mechanism based on a disengaging latch coupled with a spring, preferably one of adjustable rigidity. Under normal forces acting on the releasing stand, the pivoting frame remains secured in the basic position with respect to the stationary frame. In case the forces increase due to the bulging conveyor belt the latch is released and the pivoting frame swivels from the vertical position, once again as in the previous example. After removing the excess material being conveyed, it is possible to move the pivoting frame back to the original position. The disengaging force of the latch can be adjusted by means of a spring with adjustable rigidity in regard to the rigidity of the belt and the physical properties of the conveyed material.

Despite certain advantages, both releasing stands have the drawback that they respond only to direct strain from the volumetrically overloaded conveyor belt. This is disadvantageous, because mechanical damaging of the initial portions of the tube conveyor may result.

Moreover, devices are known which, unlike the preceding releasing stands working on a mechanical principle, obtain information as to the overfilling of the conveyor belt and transmit signals by electrical or electromechanical devices. These devices are based on a detection of deformation of the conveyor belt.

One of these electromechanical devices (CN 204355697) comprises three touch sensors which are mounted around the outer surface of the coiled conveyor belt in the gaps between pairs of rollers of the same stand. The touch sensors are coupled to switches which send a signal upon compression of the touch sensors, which occurs in situations when the conveyor belt is deformed beyond the allowable shape.

In another device (JPH 10181841) the deformation of the conveyor belt is detected by three upper rollers of the same stand, which rollers are mounted on pivoting brackets which are pressed from the outside against the conveyor belt. Switches with similar operation to the preceding example are coupled to the brackets.

Another device (KR 20040081822) contains a hinge, which is placed beneath the coiled conveyor belt and which has a direction the same as the direction of movement of the conveyor belt. On the hinge are mounted two collets which are pressed together, each of which is fitted with three rollers. Upon deformation of the conveyor belt, the collets move apart, and their movement is relayed to a switch, whose signal has a similar purpose to that of the above described devices.

The advantage of the electromagnetic devices of the known design is that the signals from the sensors can be used for potential control of the entire tube conveyor, but their major drawback lies in the fact that, just like the mechanical devices, they respond only to a state of overfilling of the conveyor belt.

A device is also known which does not have any moving mechanical parts. In this device (EP 2128049) permanent magnets are vulcanized in the conveyor belt in a plane perpendicular to its movement, which creates an electromagnetic field. Noncontact sensors are arranged on the stands, whose signals are processed in an evaluation unit. In this way, information is obtained as to the shape of the conveyor belt, both in regard to its deformation from overfilling and deformation caused by turning. The advantage that this device does not have mechanical parts prone to defects in the form of touch sensitive buttons, for example, is weakened by the drawback which is common to all of the preceding devices. This drawback is that they respond only when a defect condition occurs.

SUMMARY OF THE INVENTION

The above described disadvantages is substantially lessened by a device for protecting the conveyor belt of a tube conveyor against volumetric overloading according to an exemplary embodiment of the invention.

It is therefore an object of the invention to provide a tube conveyor that comprises a middle part, situated between a filling site and a discharge site. In the middle part of the conveying branch the conveyor belt is wound essentially into the shape of a tube by the action of rollers, rotationally mounted on roller stands and arranged into a regular n-hedron. Due to the technical solution a measuring stand is arranged behind the filling site, the measuring stand comprises a stationary frame and a swiveling frame able to rotate relative to it. The movement of the swiveling frame is defined by the half-space which is situated beyond the swiveling frame, looking in the direction of movement of the conveyor belt. The lower rollers from the space beneath the horizontal transverse axis of the coiled conveyor belt are mounted on the stationary frame, while at least the upper inclined rollers, which are arranged above the horizontal transverse axis of the coiled conveyor belt, are mounted to the swiveling frame. The measuring stand comprises a force measuring device which is adapted to continuous detection of the loading forces transferred from the conveyor belt. At the same time, the force measuring device is adapted to relay a signal about the loading forces to a control unit. The control unit comprises a comparison circuit, adapted for continuous comparing of the instantaneous value of the loading forces to a reference value which represents the maximum allowable loading force. The comparison circuit is likewise adapted to send a switch-off signal both to the traction of the conveyor belt and to a locking mechanism. The locking mechanism is adapted to lock the swiveling frame to the stationary frame during movement of the conveyor belt and to release it after receiving the switch-off signal.

An advantage of the device according to an exemplary embodiment is based on a measurement of the force reactions from the loading forces over the entire period of travel of the conveyor belt, and not on a measurement of the deformation of the conveyor belt, while the information as to the magnitude of the loading forces is continually available. Moreover, the information about the volumetric overloading is available directly after the filling point, especially if the measuring stand is located as the first in sequence beyond the filling point in the direction of movement of the conveyor belt.

The reference value of the loading forces can be supplied to the comparison circuit as a constant quantity. However, it is much more advantageous if the reference value of the loading forces is the arithmetic mean of the previous loading forces from the non-overloaded conveyor belt over the running time. In this way, for example, changes in physical properties of an ageing conveyor belt are reflected in it. This also is an advantage which comes from the fact that information about the loading forces is continually available, both in the case of stable movement of the conveyor belt and in the case of its overfilling. Thus, the device according to the invention has a self-teaching ability.

An important element of the device is the force measuring device, which can have several designs. In the context of a first group of force measuring devices the swiveling frame is pivoted on the stationary frame about a horizontal axis, situated above the conveyor belt in a direction perpendicular to the direction of its movement, while the force measuring device contains a weighing cell which is secured to at least one upper roller from the space above the horizontal transverse axis of the coiled conveyor belt.

An alternative to the first group of force measuring devices is based on the fact that the swiveling frame is formed of two segments, each segment being pivoted on the stationary frame so that it is adapted for independent swiveling into the half-space situated beyond the swiveling frame looking in the direction of movement of the conveyor belt. On each segment is mounted an upper inclined roller, while on the stationary frame there is mounted the upper horizontal roller. The force measuring device contains a weighing cell which is secured to at least one upper roller from the space above the horizontal transverse axis of the coiled conveyor belt.

In the context of a second group of force measuring device, the measuring stand contains at least one weighing cell, which is secured to the stationary frame at the junction with the swiveling frame and which is adapted to detect the axial forces transmitted from the conveyor belt to the measuring stand.

A third group of force measuring device is based on the fact that a sliding frame is interposed between the stationary frame and the swiveling frame such that the sliding frame can slide in the stationary frame in the vertical direction, and the swiveling frame is pivoted on the sliding frame about a horizontal axis situated above the conveyor belt in a direction perpendicular to the direction of its movement. Between the stationary frame and the sliding frame is placed a weighing cell, adapted to detect forces acting in the direction of vertical movement of the sliding frame.

The measuring stand alone is sufficient for releasing of excess material when a short tube conveyor is overloaded. But for long tube conveyors, characterized by a large inertia to movement, it is useful to place at least one releasing stand behind the measuring stand and in front of a usual stand.

The releasing stand comprises a stationary frame, a pivoting frame and locking devices, whereby the releasing stand includes rollers that enclose a conveyor belt coiled into a shape of a tube and the pivoting frame is suspended from the stationary frame. Above a transverse axis of the coiled conveyor belt upper inclined rollers and an upper horizontal roller are mounted. Below a transverse axis of the coiled conveyor belt lower inclined rollers and a lower horizontal roller are mounted. The pivoting frame is able to tilt from a basic position into a half-space arranged beyond the releasing stand during movement of the coiled conveyor belt, so that the pivoting frame in the basic position is perpendicular to the direction of the longitudinal axis of the coiled conveyor belt and in the pivoted position the gap between the rollers is greater than in the basic position.

The locking device is adapted both to locking the pivoting frame in the basic position against the stationary frame during movement of the conveyor belt and to releasing it after receiving the switch-off signal from the control unit. In the released state, the pivoting frame is able to swivel into the half-space which is situated beyond the pivoting frame looking in the direction of movement of the conveyor belt, so that in the swiveled position of the pivoting frame the gap between the rollers is greater than in the locked starting position.

Another embodiment of the pivoting frame has two mirror image segments, arranged symmetrical with respect to the axis of symmetry, which is perpendicular to the longitudinal axis of the coiled conveyor belt. Each segment is pivoted at its outer edge by means of a hinge, whose axis of rotation has a position in the range from the vertical to the horizontal direction. At the inner edge of each segment is mounted an upper inclined roller. An upper horizontal roller, as well as a lower roller are mounted to the stationary frame. Each of the segments is provided with a locking mechanism that is able to retain the segment in the basic position such that the segment is pressed against the stationary frame and released when the segment rotates into the pivoted position.

The releasing stand of the technical solution has the advantage that the work of removing excess material from the volumetrically overloaded conveyor belt is less physically demanding than in the previously known designs.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The main part of the tube conveyor 1 is the conveyor belt 15, which is wound at least around a driving drum and a return drum. The driving drum is coupled to an electric traction 16. The tube conveyor 1 comprises a middle part 13, arranged between the filling site 11 (FIG. 1) and the discharge site. In the middle part 13 of the conveying branch 12, the conveyor belt 15 is coiled into the shape of a tube by the action of rollers 2. Usually the rollers 2 build a polygon, preferably a hexagon, namely, an upper horizontal roller 21, a lower horizontal roller 22, two upper inclined rollers 23 and two lower inclined rollers 24. The rollers 2 are pivoted on roller stands, which are secured to the main frame 14. The largest share in terms of quantity goes to the usual stands 3. Moreover, supports of the return branch 18, not shown, are secured to the main frame 14.

Figure 2:
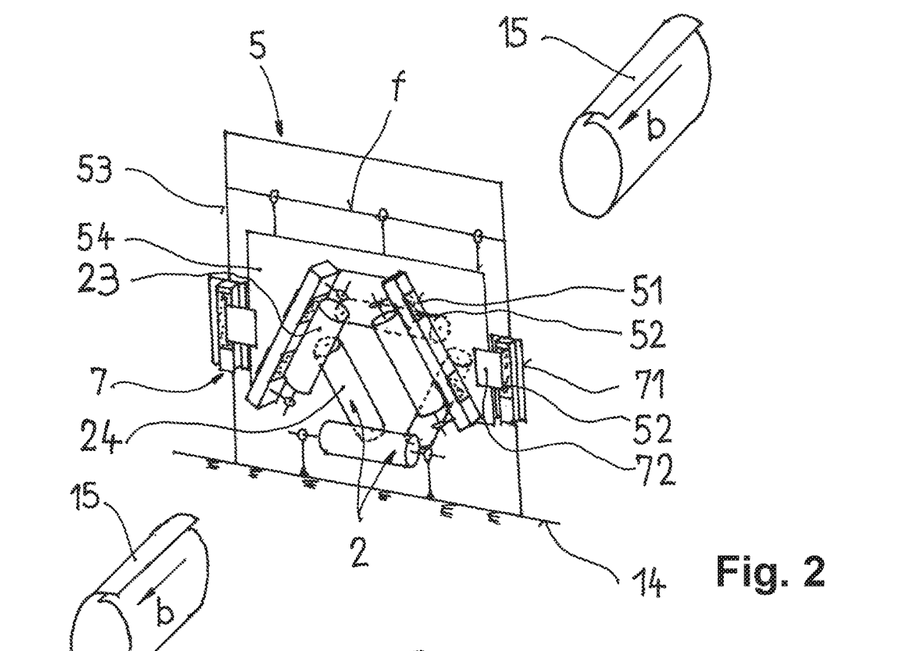
FIG. 2 shows a view of a measuring stand in direction B of FIG. 1.

Behind the filling site 11, a measuring stand 5 is mounted on the main frame 14. The measuring stand 5 is most advantageously arranged as the first in series beyond the filling site 11 looking in the direction b of movement of the conveyor belt 15. The measuring stand 5 comprises a stationary frame 53 and a swiveling frame 54 pivoting on it. In one embodiment, the swiveling frame 54 is arranged to move around a horizontal axis f situated above the conveyor belt 15 in a direction perpendicular to the direction b of its movement (FIG. 2, 3, 4). The movement is defined to a half-space which is located beyond the swiveling frame 54, looking in the direction of movement b of the conveyor belt 15. The limiting of the movement is achieved by installing a locking mechanism 7. The measuring stand 5, like the other roller stands, comprises six rollers 2. Lower rollers 22, 24 from the space below the coiled conveyor belt 15 are mounted to the stationary frame 53, while at least upper inclined rollers 23 from the space above the horizontal transverse axis h of the coiled conveyor belt 15 are mounted to the swiveling frame 54.

The measuring stand 5 comprises a force measuring device 51, which is adapted to continuous detection of the loading forces transferred from the conveyor belt 15 to the measuring stand 5. The force measuring device 51 comprising a weighing cell 52 can have different designs.

One type of force measuring device 51 is based on the fact that the forces acting on the rollers 2 of the measuring stand 5 are detected.

In FIG. 2 the swiveling frame 54 is pivoted about the horizontal axis f, the force measuring device 51 comprises a weighing cell 52 which is secured at least to one upper roller 21, 23 from the space above the horizontal transverse axis h of the coiled conveyor belt 15.

Figure 3:
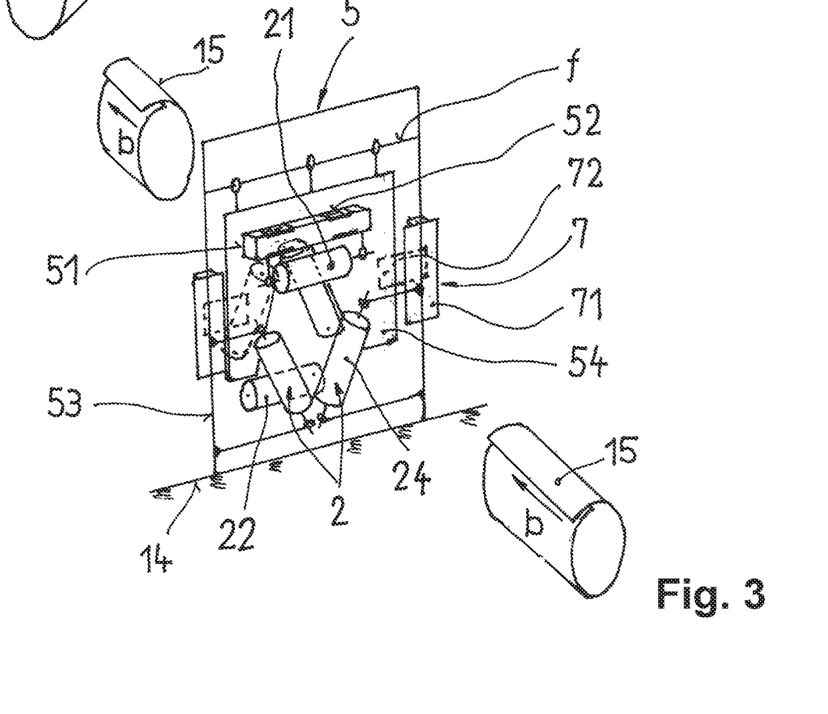
FIG. 3 shows a view of the measuring stand in direction A of FIG. 1.

An alternative type is shown in FIG. 3 where six rollers 2 are arranged on the measuring stand 5. The upper horizontal roller 21 which is mounted to the swiveling frame 54 comprises a link to a weighing cell 52. In an embodiment not shown, the upper horizontal roller 21 can be mounted to the stationary frame 53.

In the context of another alternative, in the makeup of six rollers 2 of the measuring stand 5 one upper inclined roller 23 and the upper horizontal roller 21, which are arranged on the swiveling frame 54 above the horizontal transverse axis h of the coiled conveyor belt 15, are provided with a link to weighing cells 52. Another alternative is based on the fact that all three upper rollers 21, 23, which are arranged above the horizontal transverse axis h of the coiled conveyor belt 15, are provided with a link to weighing cells 52. Another alternative is that at least one upper inclined roller 23, which is mounted to the swiveling frame 54, or per FIG. 2 both upper inclined rollers 23 are provided with a link to weighing cells 52.

Figure 7:
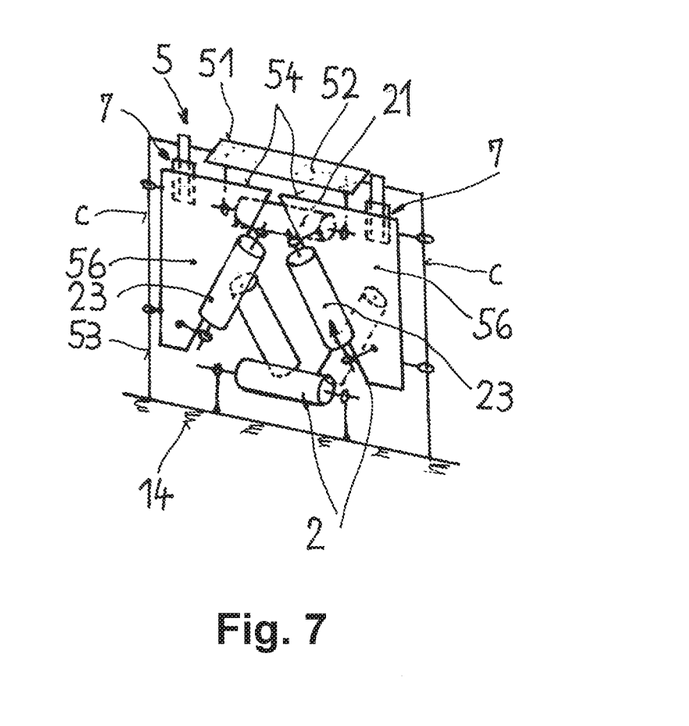
FIG. 7 shows a view of another embodiment of a measuring stand.

In FIG. 7 a similar type of force measuring device 51 is used in another embodiment of the swiveling frame 54. This swiveling frame 54 has two segments 56, each of which is pivoted on the stationary frame 53 so that it is able to move independently into the half-space which is located beyond the swiveling frame 54, looking in the direction of movement b of the conveyor belt 15. To each segment 56 an upper inclined roller 23 is mounted, while the upper horizontal roller 21 is mounted to the stationary frame 53. The force measuring device 51 contains a weighing cell 52, which is secured to at least one upper roller 21, 23 from the space above the horizontal transverse axis h of the coiled conveyor belt 15. This means that the forces from the conveyor belt 15 are detected either by one upper inclined roller 23 or by both upper inclined rollers 23 at the same time or by the upper horizontal roller 21 or by a combination of the upper horizontal roller 21 with one or both upper slanting rollers 23.

Based on the embodiment of FIG. 2 the force measuring device 51 of the measuring stand 5 contains at least one weighing cell 52, which is disposed at the junction of the stationary frame 53 with the swiveling frame 54.

The weighing cell 52 is able to detect axial forces from the conveyor belt 15 by means of a locking mechanism 7 comprising a first member 71, 74 and a second member 72, 75. The first member 71, 74 of the locking mechanism 7 is mounted to the stationary frame 53 and its second member 72, 75 to the swiveling frame 54. Due to this embodiment the locking mechanism 7 is of an electromagnetic type. Its first member 71, 74 contains an electromagnetic coil and its second member 72, 75 is formed by a strap of magnetically soft material.

Figure 4:
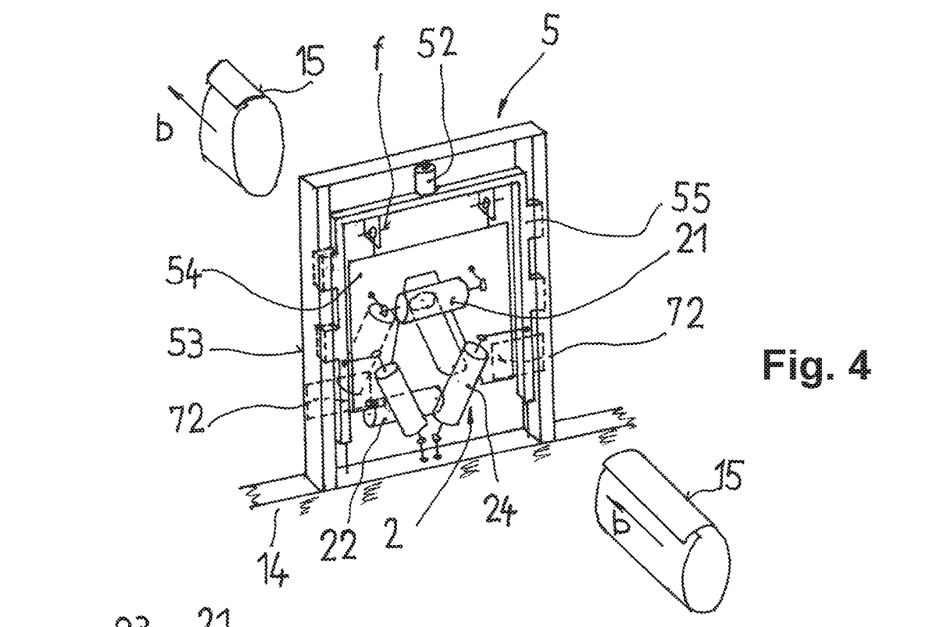
FIG. 4 shows a view of another embodiment of a measuring stand in direction A of FIG. 1 including a sliding frame.

In FIG. 4 another type of force measuring device 51 is shown. This force measuring device 51 has a sliding frame 55 interposed between the stationary frame 53 and the swiveling frame 54. The sliding frame 55 can slide within the stationary frame 53 in vertical direction. The swiveling frame 54 is able to move around a horizontal axis f arranged above the conveyor belt 15 in a direction perpendicular to the direction b of its movement. Between the stationary frame 53 and the sliding frame 55 a weighing cell 52 is placed, adapted to detect forces acting in the direction of vertical movement of the sliding frame 55.

Figure 1:
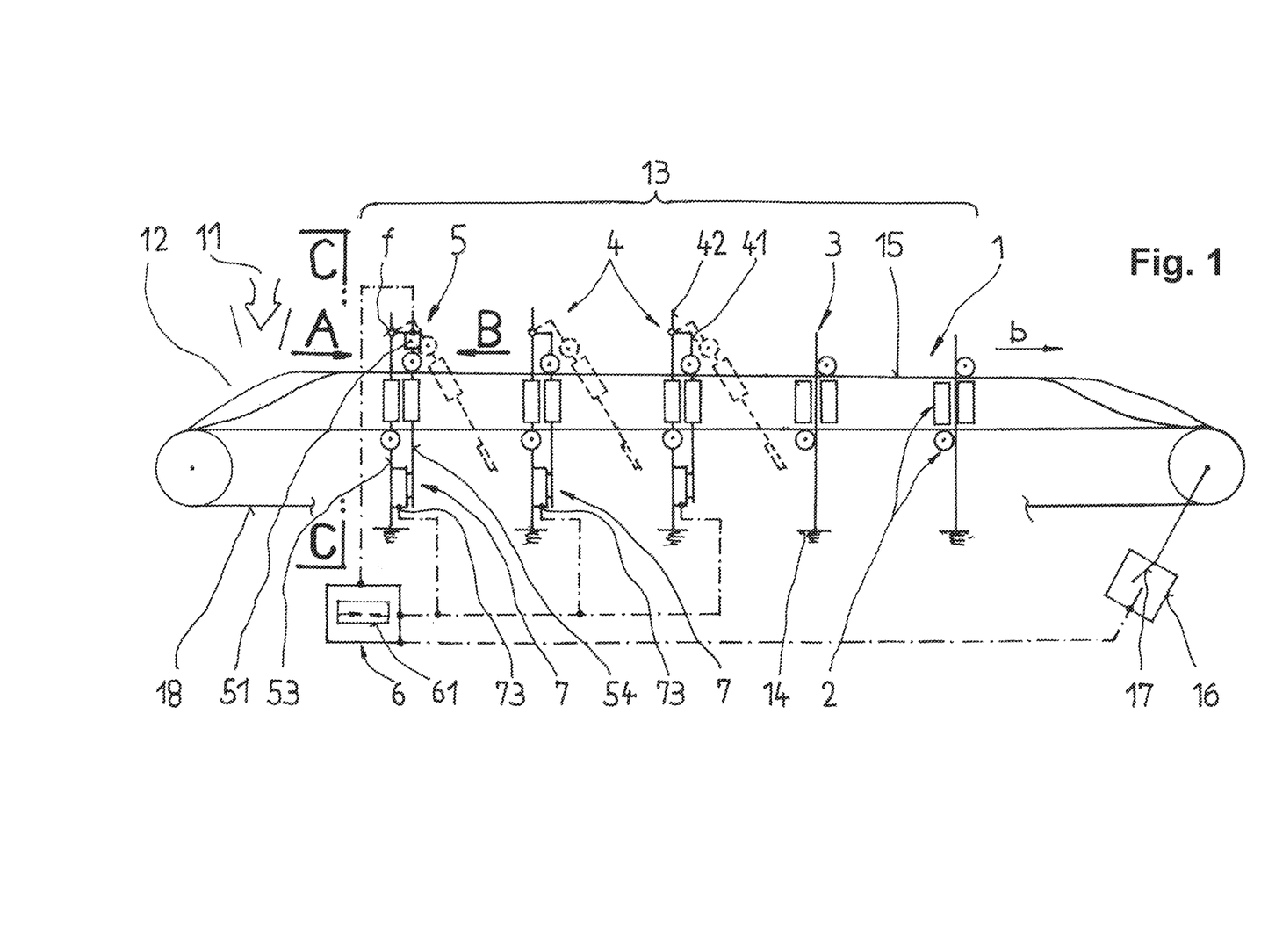
FIG. 1 shows a perspective side view of a tube conveyor with a filling site and adjoining conveying branch of the tube conveyor.

Regardless of the type of force measuring device, each force measuring device 51 is designed to relay a signal representing the loading forces to a control unit 6 (FIG. 1). The control unit 6 comprises a comparison circuit 61, adapted for continuous comparing of the instantaneous value of the loading forces to a reference value. The reference value represents a threshold. The magnitude of the reference value is equal to the maximum allowable loading force. The reference value can be set as a constant value. As the conveyor belt 15 changes its physical properties over the time, the packing forces and its ability to withstand the pressure of the change of the material being conveyed 19. It is therefore advantageous for the control unit 6 to be provided with an algorithm which determines the reference value of the loading forces as the average value of the preceding loading forces from the non-overloaded conveyor belt 15 over the time.

The control unit 6 is adapted to generate a switch-off signal when the reference value is exceeded. The control unit 6 is further designed to send the switch-off signal both to the traction 16 of the conveyor belt 15 and to the locking mechanism 7, with which the measuring stand 5 is equipped. By the action of the locking mechanism 7, the swiveling frame 54 of the measuring stand 5 during the movement of the conveyor belt 15 is locked in the motionless position against the stationary frame 53. In the locking mechanism 7 of electromagnetic type according to the sample embodiment, the locking is provided by electromagnetic forces. In this case, the switch-off signal generated by the control unit 6 has the nature of a drop, or a disconnection of the energizing voltage.

If the length of the tube conveyor 1 is short, the measuring stand 5 is sufficient for removal of excess material 19 from the overloaded conveyor belt 15. But in the case of a long tube conveyor 1, its further run until shut-off of the traction 16 is too long, and therefore at least one releasing stand 4 is secured to the main frame 14 prior to the usual stands 3. In the embodiment of FIG. 1, two releasing stands 4 are illustrated, while their number will depend especially on inertial properties of the running conveyor belt 15. The releasing stand 4 comprises a stationary frame also referred to as fixed frame 42 and a pivoting frame 41. The pivoting frame 41 is adapted both to be locked in the starting position against the fixed frame 42 and to be released for pivoting into the half-space which is situated behind the pivoting frame 41 looking in the direction b of movement of the conveyor belt 15. For the locking of the pivoting frame 41, the releasing stand 4 is equipped with a similar type of locking mechanism 7 as the measuring stand 5.

The device for protecting a conveyor belt 15 against volumetric overloading during the movement of a tube conveyor 1 is able to monitor the conveyor belt 15 and its bulging after being filled with the prepared material 19. The material 19 is loaded onto the opened conveyor belt 15 at the filling site 11, beyond which it is coiled into the shape of a tube by the action of the first roller stand. According to FIG. 1, the measuring stand 5 is the first roller stand behind the filling site 11. The loading forces which are transmitted from the conveyor belt 15 to the measuring stand 5 are measured by the force measuring device 51 and evaluated in the control unit 6. The loading forces differ according to the location of the force measuring device 51. The measuring devices 51 have a first characteristic quantity in case when the loading forces of rollers 2 (FIG. 2, 3, 7) are measured, another one if the loading forces in the area of the locking mechanism 7 are measured (FIG. 2, 3), and a third characteristic if the force actions between the sliding frame 55 and the stationary frame 53 are measured (FIG. 4).

Figure 5:
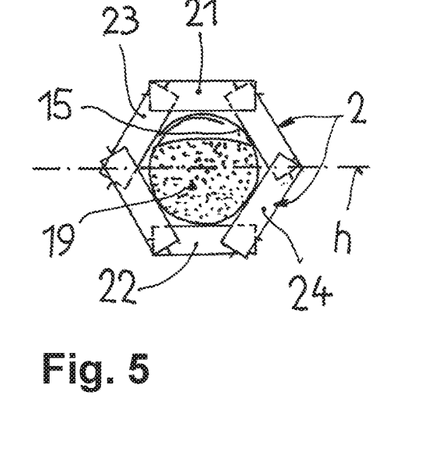
FIG. 5 shows a section C-C of FIG. 1 with normally loaded conveyor belt.

If the conveyor belt 15 is loaded with the appropriate amount of material 19, the resulting tube has a circular shape (FIG. 5) and the force measuring device 51 of the mechanism registers loading forces which are evaluated as permissible from the comparison circuit 61 of the control unit 6. The control unit 6 issues no switch-off signal, so that the traction 16 actively operates in the locking mechanism 7, the measuring stand 5 and releasing stand 4 are in the activated state, which means that the swiveling frame 54 of the measuring stand 5 is fixed in the motionless position against the stationary frame 53 and the pivoting frame 41 of the releasing stand 4 against the fixed frame 42. In a locking mechanism 7 of electromagnetic type, the fixation is provided by the attraction of the ferromagnetic strap to the electromagnetic coil.

Figure 6:
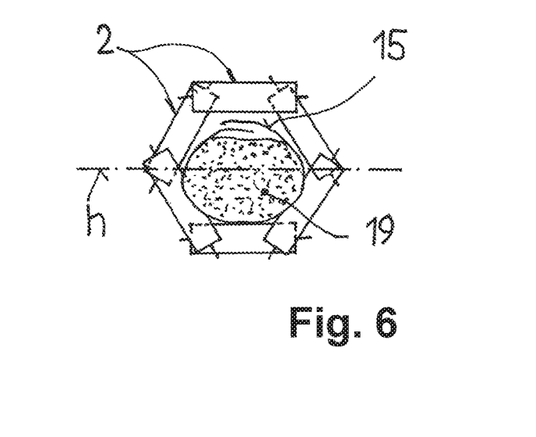
FIG. 6 shows the section C-C of FIG. 1 with a volumetrically overloaded conveyor belt.

If a volumetric overloading of the conveyor belt 15 occurs (FIG. 6), the reactive loading forces acting on the force measuring device 51 increase above the reference value and the control unit 6 issues a switch-off signal to the traction 16 and to the locking mechanism 7. In the most simple way, the switch-off signal can be a switching off of the energizing current to the traction 16 and to the locking mechanism 7. In a more complex control system, the active switch-off signal is taken to a disconnecting device 17 of the traction 16, and also to the releasing device 73 of the electromagnetic lock. The disconnecting device 17 and the releasing device 73 comprise semiconductor and relay converters operating on the contractor principle, for example, which disconnect the supply of electricity to the traction 16 and to the electromagnetic locks.

After releasing the locking mechanism 7, the fixation of the swiveling frame 54 of the measuring stand 5 and fixation of the pivoting frame 41 of the releasing stand 4 is released, while if their rollers 2 are in contact with the bulging conveyor belt 15 the respective frames (54, 41) tilt in the direction b of movement of the conveyor belt 15 as shown by the dashed lines in FIG. 1. In the pivoted position of the swiveling frame 54 and the pivoting frame 41, the gap between the rollers 2 is greater than in the starting locked position. The conveyor belt 15 opens up. The attendant adjusts the opening so that the material 19 can be manually removed from the conveyor belt 15. After this operation, the attendant returns the swiveling frame 54 and the pivoting frame 41 to the original vertical position and locks this position by means of the locking mechanism 7. The tube conveyor 1 is thus ready for further operation.

The device for protecting a conveyor belt 15 against volumetric overloading will find use especially in long tube conveyors 1 of high capacity, whose run-out is large on account of inertia, so that there is a danger of damaging many of the usual stands 3. By a quick reaction to overloading right behind the filling site 11, the conveyor belt 15 can be halted already in the section provided with the measuring stand 5 and the releasing stands 4, so that the bulge does not expand further and the structure of the tube conveyor 1 is protected against destruction. The device can be used for short tube conveyors 1, too, where merely one measuring stand 5 can be installed without the need for releasing stands 4.

Figure 8:
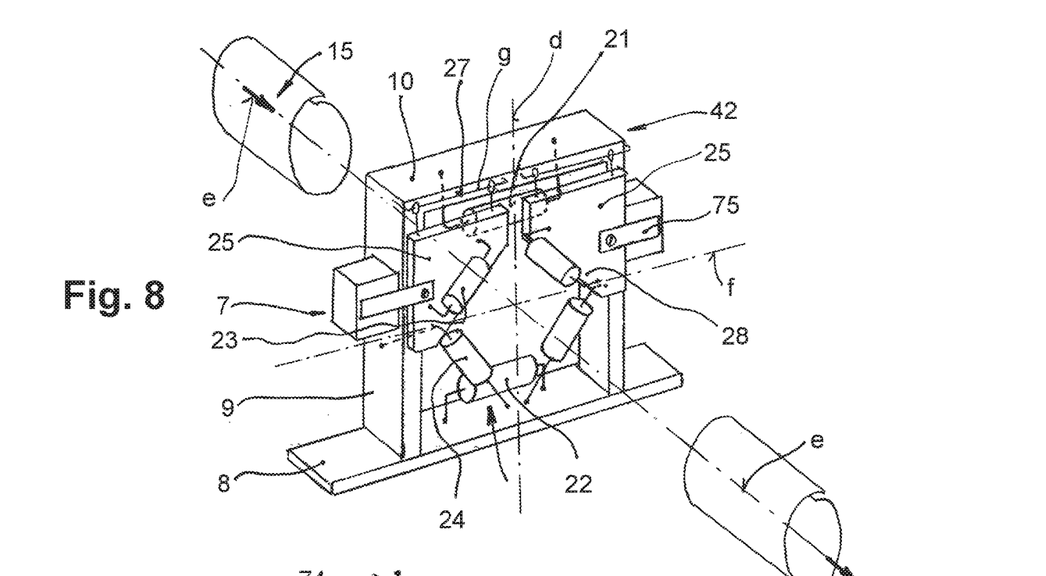
FIG. 8 shows an axonometric view of an embodiment of an releasing stand looking against a travel direction of the conveyor belt.
Figures 9, 10:
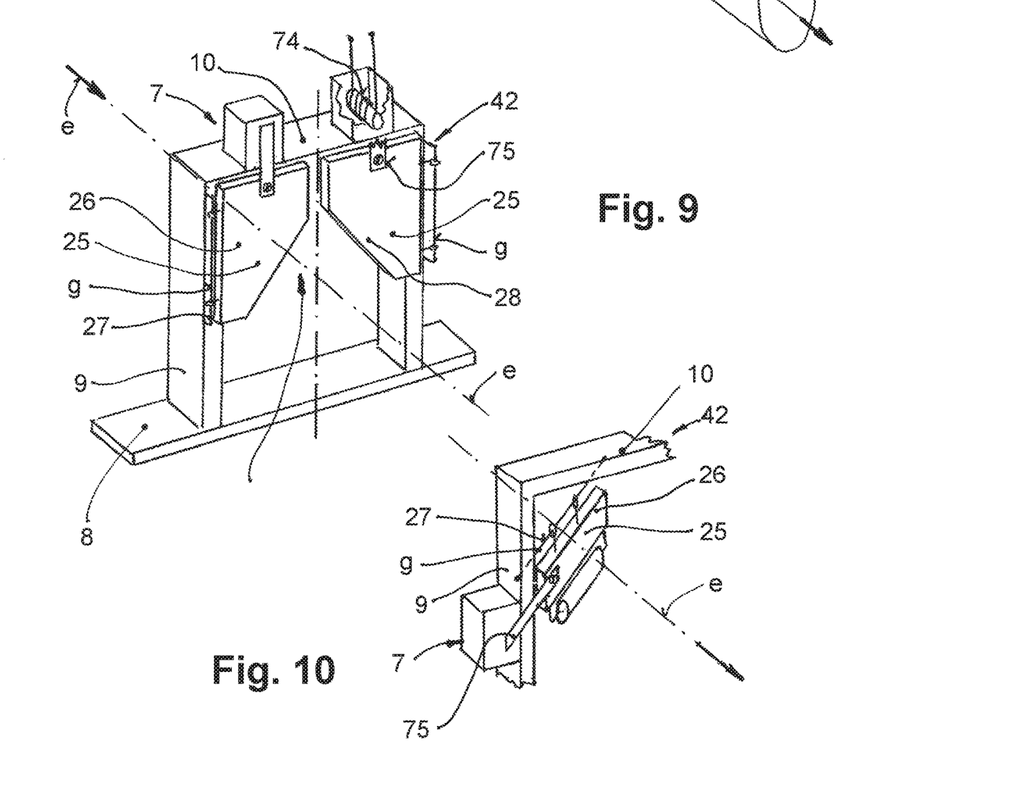
FIG. 9 shows a view looking in the same direction as FIG. 8 of a different embodiment of the releasing stand without the rollers, but with a detailed sectional view of the locking mechanism.
FIG. 10 shows a partial view of another embodiment of a releasing stand, viewed in the same direction as the previous illustrations.

In FIG. 8 to FIG. 10 different embodiments of a releasing stand 4 are shown.

The main parts of the releasing stand 4 of the tube conveyor are the fixed frame 42, the pivoting frame 41, and the rollers 2, which enclose the conveyor belt 15 that is coiled in a conveying branch into a shape of a tube (FIG. 8).

The fixed frame 42 has a cross tie 8, which is part of the support structure of the tube conveyor. Attached to the cross tie 8 are two columns 9 spaced from one another to allow the passage of the coiled conveyor belt 15. The columns 9 are joined by a stiffening lintel 10.

The pivoting frame 41 is arranged on the fixed frame 42 and has two mirror-image segments 25. The segments 25 are symmetrical in relation to an axis of symmetry d, which is perpendicular to a longitudinal axis e of the coiled conveyor belt 15. Each segment 25 is pivoted independently of the other segment at an outer edge 26 by means of a hinge 27 provided on the fixed frame 42, so that the axis of rotation g of the hinge 27 is positionable between a vertical and horizontal position. The axis of rotation g of the hinge 27 takes up the horizontal position per FIG. 8, the vertical per FIG. 9, and a inclined position per FIG. 10. The hinges 27 are designed so that the pivoting frame 41, or its segments 25, can tilt from the basic position, where they are pressed against the fixed frame 42, into the half-space behind the releasing stand in the direction where the coiled conveyor belt 15 is moved. In the basic position, the pivoting frame 41 is perpendicular to the direction of the longitudinal axis e of the coiled conveyor belt 15. This means that both segments 25 take up this position.

The releasing stand 4 is provided with six rollers 2. These are upper inclined rollers 23 and an upper horizontal roller 21, which are mounted above the transverse axis f of the coiled conveyor belt 15, and are lower inclined rollers 24 and a lower horizontal roller 22, which are mounted below the transverse axis p of the coiled conveyor belt 15. The rollers 2 are positioned such that an upper inclined roller 23 is mounted at an inner edge 28 of each segment 25, while the upper horizontal roller 21, as well as all the lower rollers, i.e., both lower inclined rollers 24 and the lower horizontal roller 22, are mounted to the fixed frame 42.

Each of the segments 25 is provided with a locking mechanism 7. The locking mechanism 7 is able to detain the segment 25 in the basic position pressed against the fixed frame 42 and to release the segment 25 prior to a movement of the segment 25 into the pivoted position. According to the embodiment shown in FIG. 9 a locking mechanism 7 of an electromagnetic type is illustrated. This is formed by an electrically energized coil 74, which is fastened to the fixed frame 42, and a strap 75 of ferromagnetic material which is fastened to the segment 25. As a technical alternative to the electromagnetic lock, one may use a locking mechanism 7 with a spring-loaded bolt or in the most simple case a spring resilient arm that is dimensioned so that it bends when increased forces are produced upon bulging of the conveyor belt 15.

During normal movement of the conveyor belt 15, each segment 25 of the releasing stand 4 occupies the basic position, in which it is pressed against the fixed frame 42, where it is held by the locking mechanism 7. With a locking mechanism 7 of an electromagnetic type, according to the above embodiment, an electric current is supplied to the electromagnetic coil 74 and the resulting electromagnetic forces hold the strap 75, by which each segment is detained. The rollers 2 enclose and hold the conveyor belt 15 in a coiled condition. When a volumetric overloading occurs, and the conveyor belt 15 bulges, its traction is switched off and the energizing of the electromagnetic locks is switched off. This results in a releasing of the segments 25, which by the action of bulging of the decelerating conveyor belt 15 are tilted from the basic position to the half-space arranged beyond the releasing stand, viewed in a direction d of movement of the coiled conveyor belt 15. A similar action, i.e., releasing of the segments 25, also occurs when using a locking mechanism 7 with mechanical locks having a spring-loaded bolt or a locking mechanism 7 with attached resilient arms. In the pivoted position of the segments 25, the gap between the rollers 2 is greater than in the basic position. The released segments 25 pivoted from the basic position can be further rotated, which further increases the gap between the rollers 2. The conveyor belt 15 can be easily opened and the excess material removed from it. After removing the excess material, the segments 25 again are reset to the basic position, where they are detained. The tube conveyor is thus ready to be restarted.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A tube conveyor with a device for protecting the conveyor belt of the tube conveyor against volumetric overloading, the tube conveyor comprising:
   a middle part arranged between a filling site and a discharge site, wherein in the middle part the conveyor belt is coiled essentially into a shape of a tube by the action of rollers, which are mounted on roller stands;
   a measuring stand arranged behind the filling site, the measuring stand comprising a stationary frame and a swivelling frame adapted to pivot relative to the stationary frame, the stationary frame comprising lower rollers mounted beneath a horizontal transverse axis of the coiled conveyor belt, the swiveling frame comprising an upper horizontal roller or upper inclined rollers mounted above the horizontal transverse axis of the coiled conveyor belt, wherein the measuring stand comprises a force measuring device provided for continuous detection of loading forces transferred from the conveyor belt, and provided for sending signals representing the loading forces to a control unit, and wherein the swivelling frame is adapted to move around a horizontal axis of the stationary frame, the horizontal axis arranged above the conveyor belt in a direction perpendicular to the direction of movement of the conveyor belt, while the force measuring device contains a weighing cell which is mounted to the upper horizontal roller or at least one of the upper inclined rollers.

2. The tube conveyor according to claim 1, wherein the control unit comprises a comparison circuit, adapted to compare the real time value of the loading forces to a reference value continuously and to generate a switch-off signal when the reference value is exceeded.

3. The tube conveyor according to claim 2, wherein the locking mechanism is able to lock the swivelling frame to the stationary frame during movement of the conveyor belt and to release the swiveling frame after receiving the switch-off signal.

4. The tube conveyor according to claim 2, wherein the reference value of the loading forces is an arithmetic mean of previous loading forces from the non-overloaded conveyor belt.

5. The tube conveyor according to claim 1, wherein the control unit is adapted to send a switch-off signal to a drive of the conveyor belt and/or to a locking mechanism.

6. The tube conveyor according to claim 1, wherein the measuring stand is arranged as the first in sequence beyond the filling site in the direction of movement of the conveyor belt.

7. The tube conveyor according to claim 1, wherein the swivelling frame is formed of two segments, each segment being pivoted on the stationary frame so that each segment is adapted for independent swivelling into the half-space situated behind the swivelling frame looking in the direction of movement of the conveyor belt, and to each segment an upper inclined roller is mounted on, while to the stationary frame the upper horizontal roller is mounted on, and the force measuring device contains a weighing cell which is secured to at least one upper roller.

8. The tube conveyor according to claim 1, wherein at least one releasing stand is arranged beyond the measuring stand and in front of usual stands, looking in the direction of movement of the conveyor belt, which comprises a fixed frame, a pivoting frame and locking devices, which is adapted to lock the pivoting frame in the basic position against the fixed frame during movement of the conveyor belt and to release the pivoting frame after receiving the switch-off signal from the control unit, wherein, in the released state, the pivoting frame is adapted to pivot into the half-space which is situated beyond the pivoting frame looking in the direction of movement of the conveyor belt, while at the same time in the pivoted position of the pivoting frame the gap between the rollers is greater than in the locked starting position.

9. The tube conveyor according to claim 1, further comprising a releasing stand, which contains rollers which enclose the conveyor belt wound into the shape of a tube, a fixed frame, and a pivoting frame suspended from the fixed frame, wherein above the transverse axis of the coiled conveyor belt are mounted upper inclined rollers and an upper horizontal roller and below the transverse axis of the coiled conveyor belt are mounted lower inclined rollers and a lower horizontal roller, while the pivoting frame is able to tilt from the basic position into a half-space situated during movement of the coiled conveyor belt beyond the releasing stand, so that the pivoting frame in the basic position is perpendicular or substantially perpendicular to the direction of the longitudinal axis of the coiled conveyor belt and in the pivoted position the gap between the rollers is greater than in the basic position, wherein the pivoting frame is formed of two mirror image segments, symmetrical in relation to the axis of symmetry which is perpendicular to the longitudinal axis of the coiled conveyor belt, while each segment is pivoted at an outer edge thereof by means of a hinge on the fixed frame, so that the axis of rotation of the hinge has a position in the range from the vertical to the horizontal direction, while at the inner edge of each segment is mounted an upper inclined roller, while the upper horizontal roller, as well as the lower inclined rollers and the lower horizontal roller are mounted on the fixed frame and each of the segments is provided with a locking mechanism, able both to detain the segment in the basic position pressed against the fixed frame and to release the segment when the segment rotates into the pivoted position.

10. A tube conveyor with a device for protecting the conveyor belt of the tube conveyor against volumetric overloading, the tube conveyor comprising:
a middle part arranged between a filling site and a discharge site, wherein in the middle part the conveyor belt is coiled essentially into a shape of a tube by the action of rollers, which are mounted on roller stands;
a measuring stand arranged behind the filling site, the measuring stand comprising a stationary frame and a swivelling frame adapted to pivot relative to the stationary frame, the stationary frame comprising lower rollers mounted beneath a horizontal transverse axis of the coiled conveyor belt, the swiveling frame comprising upper inclined rollers mounted above the horizontal transverse axis of the coiled conveyor belt,
wherein the measuring stand comprises a force measuring device provided for continuous detection of loading forces transferred from the conveyor belt, and provided for sending signals representing the loading forces to a control unit, and
wherein the movement of the swiveling frame is defined by a half-space arranged behind the swivelling frame, looking in a direction of movement of the conveyor belt.

11. The tube conveyor according to claim 10, wherein the force measuring device contains at least one weighing cell, which is mounted to the stationary frame at a junction with the swivelling frame, and which is adapted to detect axial forces from the conveyor belt.

12. A tube conveyor with a device for protecting the conveyor belt of the tube conveyor against volumetric overloading, the tube conveyor comprising:
a middle part arranged between a filling site and a discharge site, wherein in the middle part the conveyor belt is coiled essentially into a shape of a tube by the action of rollers, which are mounted on roller stands;
a measuring stand arranged behind the filling site, the measuring stand comprising a stationary frame and a swivelling frame adapted to pivot relative to the stationary frame, the stationary frame comprising lower rollers mounted beneath a horizontal transverse axis of the coiled conveyor belt, the swiveling frame comprising upper inclined rollers mounted above the horizontal transverse axis of the coiled conveyor belt, wherein the measuring stand comprises a force measuring device provided for continuous detection of loading forces transferred from the conveyor belt, and provided for sending signals representing the loading forces to a control unit, and wherein a sliding frame is interposed between the stationary frame and the swivelling frame such that the sliding frame can slide in the stationary frame in the vertical direction, and the swivelling frame is pivoted on the sliding frame about a horizontal axis situated above the conveyor belt in a direction perpendicular to the direction of movement of the conveyor belt, while between the stationary frame and the sliding frame is placed a weighing cell, adapted to detect forces acting in the direction of vertical movement of the sliding frame.

* * * * *